US008275916B2

(12) United States Patent
Kim

(10) Patent No.: US 8,275,916 B2
(45) Date of Patent: Sep. 25, 2012

(54) SYSTEM FOR PROCESSING ROUTING ACCORDING TO PRIORITIES OF LOGICAL INTERFACES AND METHOD FOR CONTROLLING THE SAME

(75) Inventor: Byoung-Chul Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 12/358,180

(22) Filed: Jan. 22, 2009

(65) Prior Publication Data

US 2009/0198845 A1 Aug. 6, 2009

(30) Foreign Application Priority Data

Feb. 5, 2008 (KR) .................. 10-2008-0011827

(51) Int. Cl.
*G06F 3/00* (2006.01)
*G06F 13/00* (2006.01)
(52) U.S. Cl. ............. 710/40; 710/244; 711/151
(58) Field of Classification Search .............. 370/412; 710/40, 36, 113, 244, 309; 711/151
See application file for complete search history.

(56) References Cited

U.S. PATENT DOCUMENTS

| 7,039,770 B1* | 5/2006 | Chen et al. ............ 711/151 |
| 7,293,136 B1* | 11/2007 | More et al. ............ 711/112 |
| 7,631,132 B1* | 12/2009 | Neuman ................ 710/244 |
| 2002/0036984 A1* | 3/2002 | Chiussi et al. ........... 370/232 |
| 2004/0213156 A1* | 10/2004 | Smallwood et al. ....... 370/232 |
| 2005/0094643 A1* | 5/2005 | Wang et al. ............ 370/395.4 |
| 2005/0207436 A1* | 9/2005 | Varma ................ 370/412 |
| 2006/0253621 A1* | 11/2006 | Brewer et al. ........... 710/40 |
| 2007/0116025 A1* | 5/2007 | Yadlon et al. ........... 370/412 |
| 2009/0141732 A1* | 6/2009 | Woo et al. ............ 370/412 |
| 2010/0118883 A1* | 5/2010 | Jones et al. ........... 370/412 |

* cited by examiner

*Primary Examiner* — Ernest Unelus
(74) *Attorney, Agent, or Firm* — Jefferson IP Law, LLP

(57) ABSTRACT

A system for processing routing according to priorities of logical interfaces is provided. The system includes a priority setting unit for setting priorities of a plurality of logical interfaces set in a physical interface, and a priority scheduler for determining a priority of a respective logical interface from an input frame, and for outputting the input frame to a driver queue of the physical interface when the input frame is output from a logical interface having the highest priority. Traffic burstiness caused by queuing can be reduced in a network routing system employing at least one logical interface.

13 Claims, 3 Drawing Sheets

SYSTEM FOR PROCESSING ROUTING ACCORDING TO PRIORITIES OF LOGICAL INTERFACES AND METHOD FOR CONTROLLING THE SAME

PRIORITY

This application claims the benefit under 35 U.S.C. §119 (a) of a Korean patent application filed in the Korean Intellectual Property Office on Feb. 5, 2008 and assigned Serial No. 10-2008-0011827, the entire disclosure of which is hereby incorporated by reference.

BACKGROUND OF THE INVENTION

1. Field of the Invention

The present invention relates to a router capable of supporting a plurality of logical interfaces in a single physical interface with high scalability. More particularly, the present invention relates to a method for supporting a traffic distribution function according to priorities of the plurality of logical interfaces while minimizing delay and traffic burstiness caused by support of the traffic distribution function.

2. Description of the Related Art

A general router supports a distribution Quality of Service (QoS) function within a bandwidth of a logical sub-interface when the logical sub-interface is created in a physical interface such as a frame relay bundle or an Ethernet.

Each logical interface existing as a sub-interface in the physical interface is regarded as an independent interface and therefore is assumed to use a bandwidth independent from the bandwidth used by the physical interface.

When a logical interface is established in a physical interface such as a frame relay bundle and a bandwidth is designated for the logical interface, a traffic distribution function can be provided within a range of the designated bandwidth according to the conventional art.

However, in networks in which traffic is processed using logical interfaces according to the conventional art, even when there is an available bandwidth in the physical interface to which the logical interfaces belong, the bandwidth is not provided to the logical interfaces due to traffic flooding.

SUMMARY OF THE INVENTION

An aspect of the present invention is to address at least the above-mentioned problems and/or disadvantages and to at least the advantages described below. Accordingly, an aspect of the present invention is to provide a system for processing routing according to priorities of logical interfaces and a method for controlling the same which are capable of, when a plurality of logical interfaces are established and used in a physical interface, supporting distribution using strict priority queuing in which a bandwidth of the physical interface is used according to the priority of each logical interface, and reducing traffic burstiness caused by queuing for a logical interface having a higher priority.

In accordance with an aspect of the present invention, a system for processing routing according to priority of logical interfaces is provided. The system includes a priority setting unit for setting priorities of a plurality of logical interfaces established in a physical interface, and a priority scheduler for determining a priority of a respective logical interface from an input frame, and for outputting the input frame to a driver queue of the physical interface when the input frame is output from a logical interface having the highest priority.

The priority scheduler may output the input frame to the driver queue of the physical interface when the input frame is output from a logical interface having the highest priority.

The priority scheduler may output the input frame to the driver queue of the physical interface without queuing the input frame in an internal queue when the input frame is output from a logical interface having the highest priority.

The priority scheduler may include at least one internal queue for queuing frames output from the plurality of logical interfaces, a priority determiner for determining whether the logical interface transmitting the input frame has the highest priority, a scheduling controller for outputting the input frames to the driver queue of the physical interface according to the priorities of the logical interfaces, and a frame measurer for cumulatively measuring the frames output to the driver queue of the physical interface by the scheduling controller, in a scheduling period, to measure an available bandwidth.

The frame measurer may set a packet processing capacity of a respective internal queue based on the measured available bandwidth in a next scheduling period, when the available bandwidth is measured.

The scheduling controller may output the input frame to the driver queue of the physical interface via a respective internal queue when the input frame is not transmitted from the logical interface having the highest priority.

The at least one internal queue in the priority scheduler may comprise at least one queue for each logical interface.

The priority scheduler may further include a feedback processor for determining a state of the driver queue of the physical interface and for controlling the internal queue so that the frame is not transmitted when a size of the frames accumulated in the driver queue of the physical interface exceeds a threshold.

In accordance with another aspect of the present invention, a method for controlling a system for processing routing according to priority of logical interfaces is provided. The method includes setting priorities of a plurality of logical interfaces, determining whether a logical interface transmitting an input frame has the highest priority, and when the input frame is output from the logical interface having the highest priority, outputting the frame to a driver queue of a physical interface.

Meanwhile, when the input frame is output from the logical interface having the highest priority, the frame may be output to the driver queue of the physical interface.

When the input frame is output from the logical interface having the highest priority, the frame may be output to the driver queue of the physical interface without queuing the input frame in an internal queue.

Meanwhile, when the input frame is not transmitted from the logical interface having the highest priority, the input frame may be output to the driver queue of the physical interface via an internal queue.

The method may further include cumulatively measuring the frames output to the driver queue of the physical interface, in a scheduling period, to measure an available bandwidth.

Measuring the available bandwidth may include, when the available bandwidth is measured, setting a packet processing capacity of an internal queue based on the measured available bandwidth in a next scheduling period.

The method may further include determining a state of the driver queue of the physical interface and controlling an internal queue so that the frame is not transmitted when a size of the frames accumulated in the driver queue of the physical interface exceeds a threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be become more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
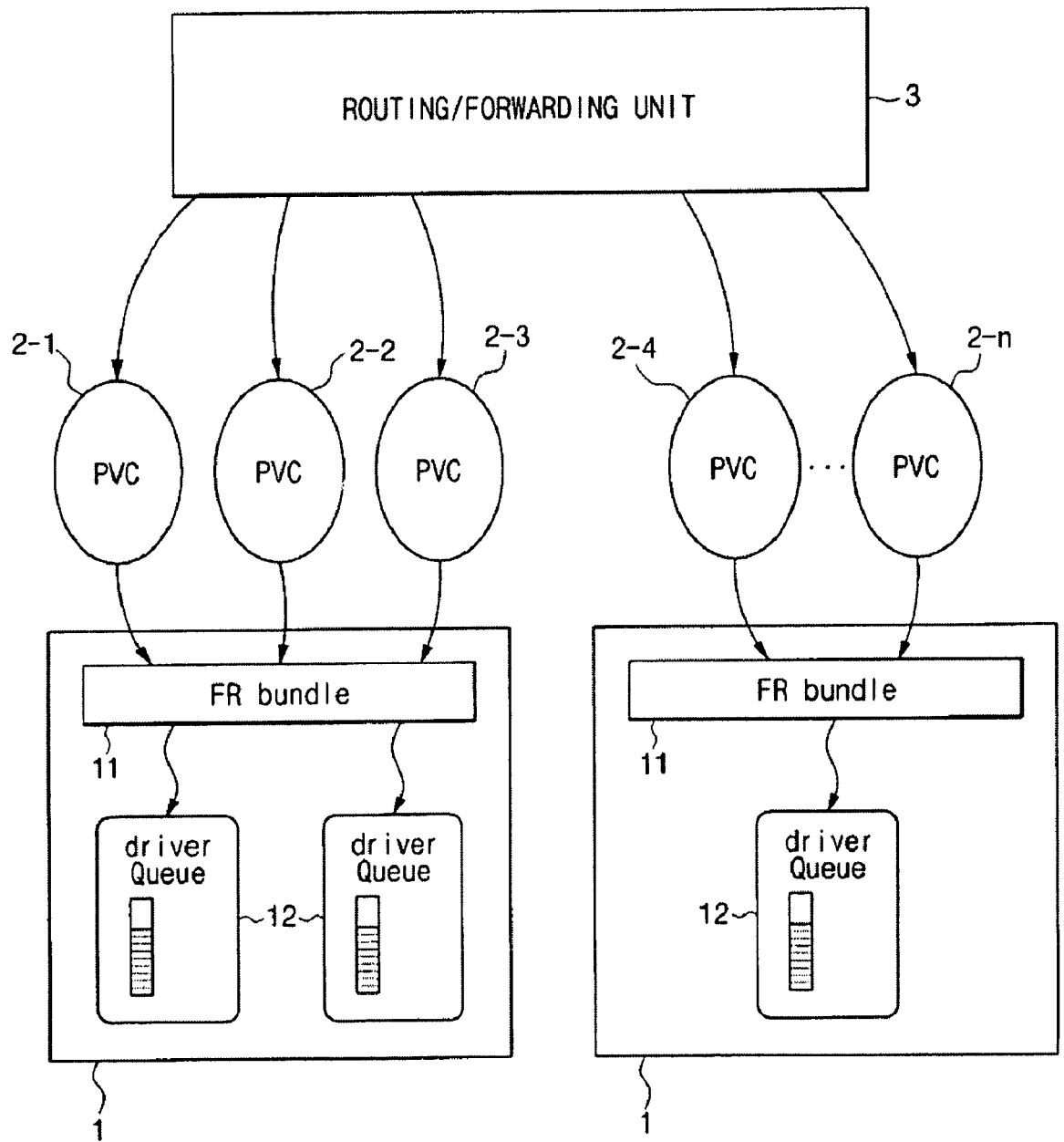
FIG. 1 is a block diagram illustrating a conventional system for processing routing according to priorities of logical interfaces.

FIG. 1 is a block diagram illustrating a conventional system for processing routing according to priorities of logical interfaces.

Referring to FIG. 1, a conventional network routing system includes a physical interface 1 including a Frame Relay (FR) bundle 11 and at least one driver queue 12, one or more logical interfaces 2-1 to 2-n, and a routing/forwarding unit 3.

The routing/forwarding unit 3 designates a frame path and outputs frames to the logical interfaces 2-1 to 2-n according to the designated frame path.

When a frame is received from the routing/forwarding unit 3, any of the logical interfaces 2-1 to 2-n processes routing of the frame by outputting the frame to the driver queue 12 via the FR bundle 11 in the physical interface 1.

Figure 2:
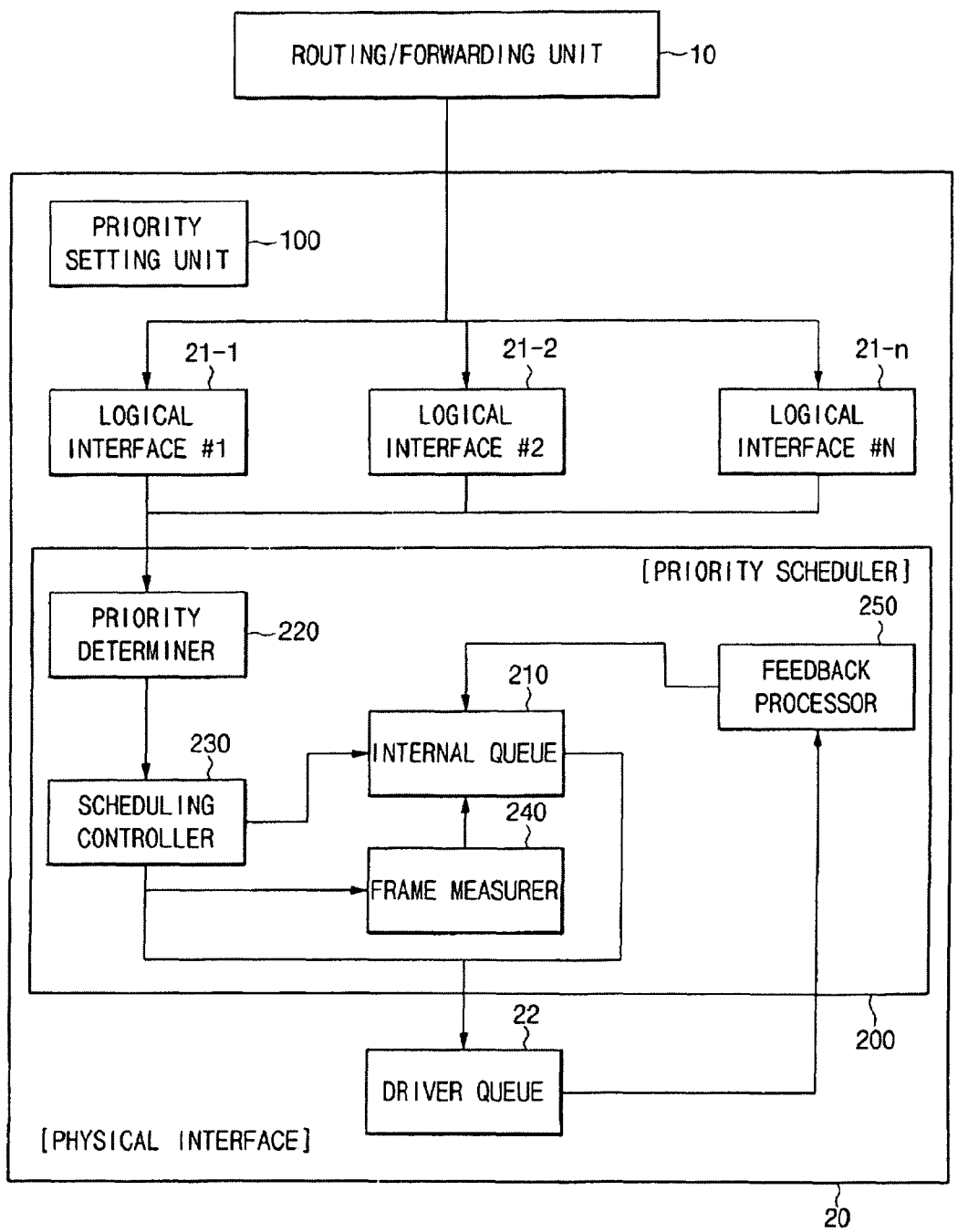
FIG. 2 is a block diagram illustrating a system for processing routing according to priorities of logical interfaces in accordance with an exemplary embodiment of the present invention.

FIG. 2 is a block diagram illustrating a system for processing routing according to priorities of logical interfaces in accordance with an exemplary embodiment of the present invention. The routing processing system according to priorities of logical interfaces in accordance with an exemplary embodiment of the present invention includes a priority setting unit 100 and a priority scheduler 200. The system further includes a routing/forwarding unit 10 that performs routing similar to the routing/forwarding unit 3 of the conventional system.

Accordingly, for conciseness of explanation, the routing/forwarding unit 10 will not be described herein.

The priority setting unit 100 sets priorities of the logical interfaces 21-1 to 21-n.

The priority scheduler 200 determines the priorities of the logical interfaces 21-1 to 21-n from the input frame. When the input frame is output from the logical interface having the highest priority among the logical interfaces 21-1 to 21-n, the priority scheduler 200 outputs the frame to the driver queue 22 of the physical interface 20 instead of queuing the frame in an internal queue 210. Herein, the priority scheduler 200 may directly output the frame to the driver queue 22 of the physical interface 20. The priority scheduler 200 includes the internal queue 210, a priority determiner 220, a scheduling controller 230, a frame measurer 240, and a feedback processor 250. Furthermore, the physical interface 20 includes an FR bundle having an operation similar to the conventional art, which, for conciseness of explanation, will not be described herein.

The internal queue 210 of the priority scheduler 200 queues frames output from the logical interfaces 21-1 to 21-n. The internal queue 210 may be implemented by at least one queue. The internal queue 210 may correspond to the logical interfaces 21-1 to 21-n.

The priority determiner 220 of the priority scheduler 200 recognizes the priorities of the logical interfaces 21-1 to 21-n from the input frames. That is, the priority determiner 220 may recognize the priorities from the input frames. Alternatively, the priority determiner 220 may recognize the priorities by referring to a predefined database.

In an exemplary implantation, the priority scheduler 200 may be implemented by the following codes:

Code that enables the frame to be processed by queuing the frame in the driver queue 22 of the physical interface instead of being queued in the internal queue 210, or that enables the frame to be processed through the internal queue 210:

```
Enqueue:
  Lookup packet's output logical interface priority;
  if (priority = 1) ← priority 1 is highest
  {
      transmit packet; ← Decrease burstiness
      record transmitted packet size; ← Metering
  }
  else if (priority != 1)
  {
      if (current queue size < max buffering queue size)
          enqueue packet;
      else
          drop packet;
  }
```

Code for a method for processing frames queued in the internal queue 210 of the priority scheduler 200 based on a queuing state of the driver queue 22 in the physical interface 20:

```
Dequeue:
  Get physical interface's available bandwidth;
  while (available bandwidth > 0)
  {
      Get packet from logical interface's priority queue;
      if (available bandwidth >= packet size)
      {
          if (driver queue full) ← Driver queue status feed back
              skip transmit packet;
          transmit packet;
          decrease available bandwidth by packet size;
      }
```

```
    else
        stop transmitting logical interface's priority queue;
    }
    Reset logical interface (priority = 1) transmit count;
```

The codes are not limited to the above exemplary implantations.

That is, the scheduling controller 230 of the priority scheduler 200 may output the frames to the driver queue 22 of the physical interface 20 instead of queuing the frames in the internal queue 210 according to the priorities of the logical interfaces 21-1 to 21-n. Herein, the scheduling controller 230 of the priority scheduler 200 may directly output the frames to the driver queue 22 of the physical interface 20. If the input frame is not transmitted from any of the logical interfaces 21-1 to 21-n having the highest priority, the scheduling controller 230 outputs the frames from the logical interfaces 21-1 to 21-n to the driver queue 22 of the physical interface 20 via the internal queue 210. Here, an available bandwidth is managed by strict priority queuing in which the available bandwidth is used by a logical interface having a next higher priority.

The frame measurer 240 of the priority scheduler 200 cumulatively measures, in a scheduling period, frames output to the driver queue 22 of the physical interface 20 instead of being queued in the internal queue 210 via the scheduling controller 230, to measure an available bandwidth. After measuring the available bandwidth, the frame measurer 240 sets a packet processing capacity of the internal queue 210 based on the measured available bandwidth in a next scheduling period.

Meanwhile, the internal queue 210 included in the priority scheduler 200 is comprised of at least one queue.

The feedback processor of the priority scheduler 20 refers to a state of the driver queue 22 in the physical interface 20 and controls the internal queue 210 so that the frame is not transmitted, when the size of the frames accumulated in the queue exceeds a threshold.

While general functions and operations of the above-described components will not be further described herein, their specific operation in connection with exemplary embodiments of the present invention will be described below.

First, one or more logical interfaces 21-1 to 21-n may be set in the physical interface 20.

Priorities of the logical interfaces 21-1 to 21-n are set by the priority setting unit 100. For any one of the logical interfaces 21-2 to 21-n having the highest priority, a priority value is set to 1 in the frame.

The priority scheduler 200 then recognizes the priorities of the logical interfaces 21-1 to 21-n from the frames output from the logical interfaces 21-1 to 21-n, using the priority determiner 220. That is, the priority scheduler 200 can recognize the priorities of the logical interfaces 21-1 to 21-n by checking the priority value of the frame. Here, a priority value of 1 indicates the highest priority.

If the frame is output from any one of the logical interfaces 21-1 to 21-n having the highest priority, the scheduling controller 230 outputs the frame to the driver queue 22 of the physical interface 20 instead of queuing the same in the internal queue 210 according to the priorities of the logical interfaces 21-1 to 21-n. Here, the scheduling controller 230 may directly output the frame to the driver queue 22 of the physical interface 20. In addition, the logical interface having the highest priority may be one logical interface or a group of logical interfaces.

The frame measurer 240 of the priority scheduler 200 cumulatively measures the frames output by the scheduling controller 230 to the driver queue 22 of the physical interface 20 instead of being queued in the internal queue 210, in a scheduling period, to measure an available bandwidth. After measuring the available bandwidth, the frame measurer 240 sets the packet processing capacity of the internal queue based on the measured available bandwidth in a next scheduling period.

Meanwhile, if the input frame is not output from the logical interface having the highest priority among the logical interfaces 21-1 to 21-n, the scheduling controller 230 outputs the frame to the driver queue 22 of the physical interface 20 via the internal queue 210.

The internal queue 210 of the priority scheduler 200 may be implemented by at least one queue to correspond to each of the logical interfaces 21-1 to 21-n.

The priority determiner 220 of the priority scheduler 200 recognizes the priorities of the logical interfaces 21-1 to 21-n from the input frame. That is, the priority determiner 220 may recognize the priority from the input frame or a predefined database.

The method for controlling the system for processing routing according to priorities of the logical interfaces according to exemplary embodiments of the present invention will now be described with reference to FIG. 3.

Figure 3:
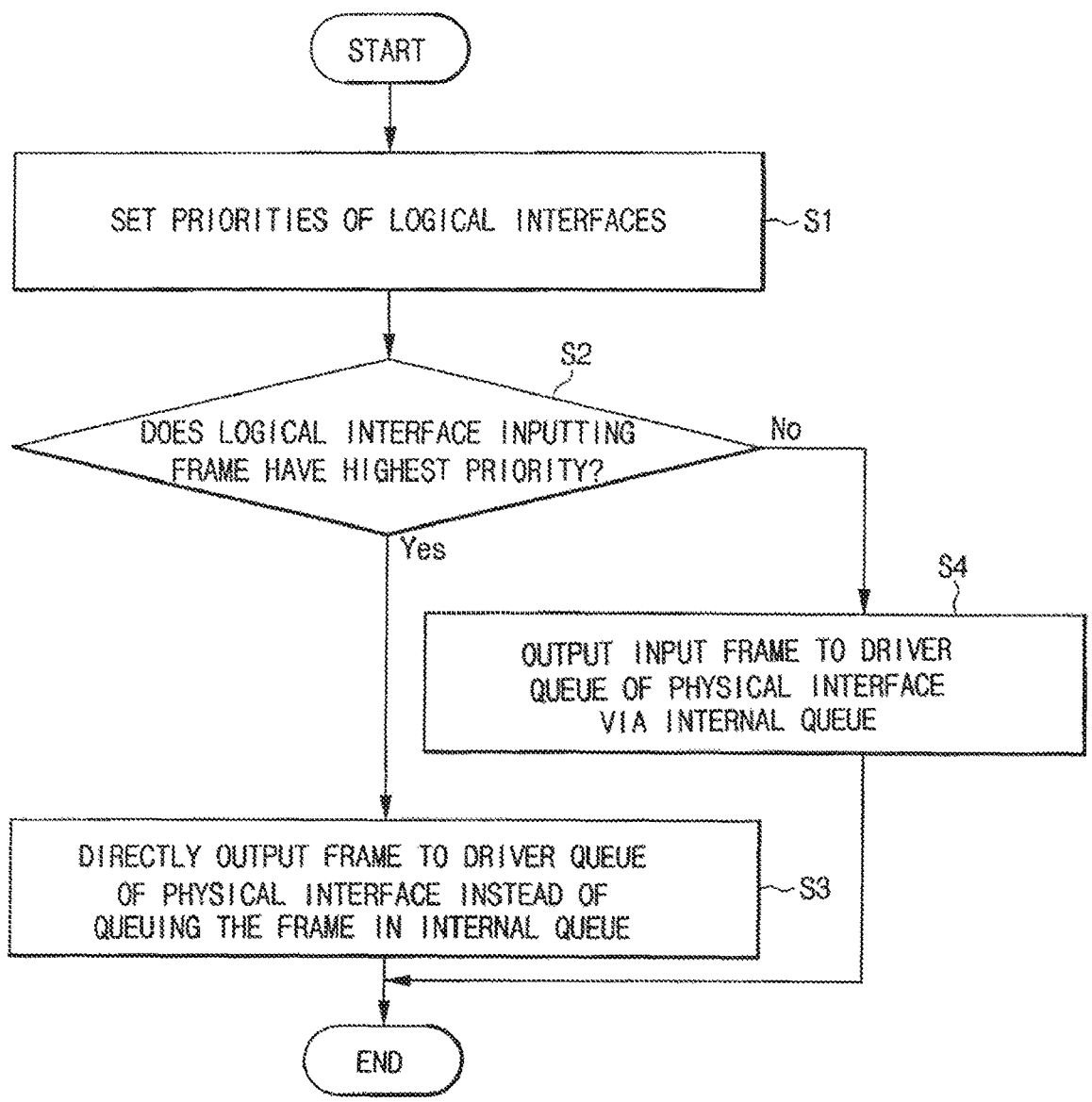
FIG. 3 is a flowchart illustrating a method for controlling a system for processing routing according to priorities of logical interfaces in accordance with an exemplary embodiment of the present invention.

FIG. 3 is a flowchart illustrating a method for controlling the system for processing routing according to priorities of logical interfaces in accordance with an exemplary embodiment of the present invention.

Referring to FIG. 3, the priorities of the logical interfaces 21-1 to 21-n are set in step S1.

A determination is then made as to whether one of the logical interfaces 21-1 to 21-n transmitting the input frame has the highest priority in step S2.

If it is determined that the input frame is output from the one of the logical interfaces 21-1 to 21-n having the highest priority (YES) in step S2, the frame is output to the driver queue 22 of the physical interface 20 instead of being queued in the internal queue 210 in step S3.

In contrast, if it is determined in step S2 that the input frame is not output from the one of the logical interfaces 21-1 to 21-n having the highest priority (NO), the frame is output to the driver queue 22 of the physical interface 20 via the internal queue 210 in step S4. Here, an available bandwidth is managed by strict priority queuing in which all the bandwidth is used by a logical interface having a next higher priority.

In the exemplary method, the frames that are output to the driver queue of the physical interface instead of being queued in the internal queue are cumulatively measured in a scheduling period, to measure an available bandwidth, and the packet processing capacity of the internal queue is set based on the measured available bandwidth in a next scheduling period.

Furthermore, a state of the driver queue 22 in the physical interface 20 is determined and the internal queue is controlled so that the frame is not transmitted when a size of the accumulated frames exceeds a threshold.

As described above, with the system for processing routing according to priorities of logical interfaces and the method for controlling the same according to an exemplary embodiment of the present invention, traffic burstiness caused by queuing can be reduced in a network routing system employing at least one logical interface. Tables 1 and 2 show performance of a priority shaping scheduler between multi-logical interfaces. The performance was measured under conditions of transmitting a 64-byte packet to a T1 interface 4 port at a rate of 120,000 frames per second for ten minutes using a multi-link Point-to-Point Protocol (PPP), and two classes, i.e., a real-time class and a data class, are created as traffic classes. When service is provided with the real-time class allocated to a zero delay queue, delay is 458 µs, which is similar to 454 µs with no Class Based Queuing (CBQ) in which service is provided without queuing, and the data class exhibits a measured delay of 3 ms with CBQ.

TABLE 1

Performance Comparison (No over rate)

| | Delay (ms) | | |
|---|---|---|---|
| | Average | Max | Min |
| Highest priority | 1.3 | 3.5 | 0.6 |
| Low priority | 4.3 | 6.8 | 1.6 |

TABLE 2

Performance Comparison (13% over rate)

| | Delay (ms) | | |
|---|---|---|---|
| | Average | Max | Min |
| Highest priority | 3.6 | 5.1 | 0.6 |
| Low priority | 4.8 | 6.1 | 3.4 |

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A routing system in which at least one logical interface is set in a physical interface, the system comprising:
    a priority setting unit for setting priorities of a plurality of logical interfaces set in a physical interface;
    a priority scheduler for determining a priority of a respective logical interface from an input frame, for outputting the input frame directly to a driver queue of the physical interface when the input frame is output from a logical interface having the highest priority without first outputting the input frame to an internal queue of the physical interface, and for outputting the input frame to the driver queue via the internal queue of the physical interface when the input frame is output from a logical interface that does not have the highest priority; and
    a frame measurer controlled by a feedback processor, for setting a frame processing capacity of the internal queue based on a measured available bandwidth of frames to the driver queue.

2. The system of claim 1, wherein the priority scheduler outputs the input frame to the driver queue of the physical interface without queuing the input frame in an internal queue when the input frame is output from a logical interface having the highest priority.

3. The system of claim 1, wherein the priority scheduler comprises:
    at least one internal queue for queuing frames output from the plurality of logical interfaces;
    a priority determiner for determining whether the logical interface transmitting the input frame has the highest priority;
    a scheduling controller for outputting the input frames to the driver queue of the physical interface according to the priorities of the logical interfaces; and
    a frame measurer for cumulatively measuring the frames output to the driver queue of the physical interface by the scheduling controller, in a scheduling period, to measure an available bandwidth.

4. The system of claim 3, wherein the frame measurer sets a packet processing capacity of a respective internal queue based on the measured available bandwidth in a next scheduling period, when the available bandwidth is measured.

5. The system of claim 3, wherein the scheduling controller outputs the input frame to the driver queue of the physical interface via a respective internal queue when the input frame is not transmitted from the logical interface having the highest priority.

6. The system of claim 3, wherein the at least one internal queue in the priority scheduler comprises at least one queue for each logical interface.

7. The system of claim 3, wherein the priority scheduler further comprises the feedback processor for determining a state of the driver queue of the physical interface and for controlling the internal queue so that the frame is not transmitted when a size of the frames accumulated in the driver queue of the physical interface exceeds a threshold.

8. A method for controlling a system for processing routing according to priority of logical interfaces, the method comprising:
    setting priorities of a plurality of logical interfaces;
    determining whether a logical interface transmitting an input frame has the highest priority;
    when the input frame is output from the logical interface having the highest priority, directly outputting the frame to a driver queue of a physical interface without first outputting the frame to an internal queue of the physical interface; and
    when the input frame is not output from the logical interface having the highest priority, outputting the frame to the driver queue via the internal queue,
    wherein a frame processing capacity of the internal queue is set by a frame measurer under the control of a feedback processor based on a measured available bandwidth of frames to the driver queue.

9. The method of claim 8, wherein when the input frame is output from the logical interface having the highest priority, the frame is output to the driver queue of the physical interface without queuing the input frame in an internal queue.

10. The method of claim 8, further comprising outputting the input frame to the driver queue of the physical interface via an internal queue when the input frame is not transmitted from the logical interface having the highest priority.

11. The method of claim 8, further comprising:
    cumulatively measuring the frames output to the driver queue of the physical interface, in a scheduling period; and
    measuring an available bandwidth.

12. The method of claim 11, wherein the measuring of the available bandwidth comprises setting a packet processing capacity of an internal queue based on the measured available bandwidth in a next scheduling period when the available bandwidth is measured.

13. The method of claim 8, further comprising determining a state of the driver queue of the physical interface and controlling an internal queue so that the frame is not transmitted when a size of the frames accumulated in the driver queue of the physical interface exceeds a threshold.

* * * * *